United States Patent
Altberg et al.

(10) Patent No.: US 6,353,928 B1
(45) Date of Patent: Mar. 5, 2002

(54) FIRST RUN INSTALLER

(75) Inventors: Ebbe Altberg; Jennifer C. Crockrill, both of Bellevue; Thomas E. Hussey, Bothell, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/225,028

(22) Filed: Jan. 4, 1999

(51) Int. Cl.$^7$ .............................................. G06F 9/445
(52) U.S. Cl. ......................... 717/11; 709/318; 709/327
(58) Field of Search ........................... 717/11; 709/221, 709/222, 327, 321, 318, 331; 713/1, 100; 707/203, 200

(56) References Cited

U.S. PATENT DOCUMENTS

| | | |
|---|---|---|
| 5,421,009 A | 5/1995 | Platt |
| 5,473,772 A * | 12/1995 | Halliwell et al. ............... 717/11 |
| 5,535,326 A | 7/1996 | Baskey et al. |
| 5,555,416 A | 9/1996 | Owens et al. |
| 5,586,304 A | 12/1996 | Stupek, Jr. et al. |
| 5,625,823 A | 4/1997 | Debenedictis et al. |
| 5,630,076 A * | 5/1997 | Saulpaugh et al. .......... 710/104 |
| 5,644,766 A | 7/1997 | Coy et al. |
| 5,655,081 A | 8/1997 | Bonnell et al. |
| 5,659,547 A | 8/1997 | Scarr et al. |
| 5,692,129 A | 11/1997 | Sonderegger et al. |
| 5,732,266 A * | 3/1998 | Moore et al. ................ 713/1 |
| 5,732,275 A * | 3/1998 | Kullick et al. ................ 717/11 |
| 5,742,829 A | 4/1998 | Davis et al. |
| 5,752,042 A | 5/1998 | Cole et al. |
| 5,764,992 A * | 6/1998 | Kullick et al. ................ 717/11 |
| 5,768,566 A | 6/1998 | Harikrishan et al. |
| 5,778,234 A | 7/1998 | Hecht et al. |
| 5,784,612 A | 7/1998 | Crane et al. |
| 5,790,664 A | 8/1998 | Coley et al. |
| 5,790,856 A | 8/1998 | Lillich |
| 5,796,967 A | 8/1998 | Filepp et al. |
| 5,805,897 A | 9/1998 | Glowny |
| 5,835,911 A | 11/1998 | Nakagawa et al. |
| 5,859,969 A | 1/1999 | Oki et al. |
| 5,859,978 A | 1/1999 | Sonderegger et al. |
| 5,867,713 A | 2/1999 | Shrader et al. |
| 5,867,714 A | 2/1999 | Todd et al. |
| 5,870,762 A | 2/1999 | Lee |
| 5,897,640 A | 4/1999 | Veghte et al. |
| 5,925,127 A | 7/1999 | Ahmad |
| 5,930,513 A | 7/1999 | Taylor |
| 5,930,514 A | 7/1999 | Thompson et al. |
| 5,933,647 A | 8/1999 | Aronberg et al. |
| 5,954,827 A | 9/1999 | Frank et al. |
| 5,960,204 A * | 9/1999 | Yinger et al. ................ 717/11 |
| 5,966,540 A | 10/1999 | Lister et al. |
| 5,978,590 A * | 11/1999 | Imai et al. .................... 717/11 |
| 5,987,504 A | 11/1999 | Toga |
| 5,999,740 A * | 12/1999 | Rowley ........................ 717/11 |
| 6,006,034 A * | 12/1999 | Heath et al. .................. 717/11 |
| 6,006,035 A | 12/1999 | Nabahi |
| 6,009,274 A | 12/1999 | Fletcher et al. |
| 6,009,401 A | 12/1999 | Horstmann |
| 6,021,438 A | 2/2000 | Duvvoori et al. |
| 6,023,586 A * | 2/2000 | Gaisford et al. .............. 717/11 |
| 6,029,147 A | 2/2000 | Horadan et al. |
| 6,041,333 A | 3/2000 | Bretschneider et al. |
| 6,067,582 A | 5/2000 | Smith et al. |
| 6,131,192 A * | 10/2000 | Henry ........................ 717/11 |
| 6,151,643 A | 11/2000 | Cheng et al. |
| 6,151,708 A | 11/2000 | Pedrizetti et al. |
| 6,161,218 A | 12/2000 | Taylor |
| 6,205,527 B1 | 3/2001 | Goshey et al. |

OTHER PUBLICATIONS

"Automating Microsoft Transaction Server Client Installation," Microsoft Corporation, URL:wysiwyg://MAIN-.PRODINFO.6/http://msdn.mi . . . m/library/backgrnd/html/msdn_install.html (Jun. 1997). printed Feb. 29, 2000.

"Seagate Enterprise Management Software—East Announces Release of Desktop Management Suite," *Business Wire*, p. 04020056 (Apr. 2, 1996).

Dunigan, et al., *MCSE Training Guide: Windows NT Workstation 4*, New Riders Publishing, pp. 28–32, 402–405, 486–492 (1997).

Lang, Jay., "IBM Bolsters Windows NT Reliability With Tools Suite," *Information Week*, p. A6ff (Jul. 20, 1998).

Kelly, M., "Gain Control of Application Setup and Maintenance with the New Windows Installer". Microsoft System Journal, Sep. 1998, pp. 15–27.

Green, "Windows Apps Need To Be Aware of Install Methods", *Network World*, p. 45 (November 1994).

McKinney et al., "Win Tips Windows 9x", *Windows Magazine*, pp. 225–258 (August 1998).

McNutt, "Administering X Sites", *Unix Review*, p. 45ff (July 1992).

Methvin, David, "Problems?In Win98?", *Windows Magazine*, p. 224ff (October 1998).

Spanbauer, Scott, "Internet Explorer 4.0, Problem Child", *PC World*, p. 53 (January 1998).

\* cited by examiner

*Primary Examiner*—Tuan Q. Dam
(74) *Attorney, Agent, or Firm*—Michalik & Wylie, PLLC

(57) ABSTRACT

A method for installing files required by an application during execution, without requiring the user to invoke a installation procedure if the required file is deleted or missing. Briefly described, the present invention makes possible a method for detecting whether a file required by the application's execution is missing. If the file is missing, the application calls an installer module to install the missing file in the location expected by a shared library Dynamic Link Library (DLL). The application then terminates. In the event a second required file is being used by another application or computer process, the installer module will restart the system following the replacement of the missing file. In the event that a second required file is not being used by another application or computer process, the install module re-executes the application after replacing the missing required file.

21 Claims, 4 Drawing Sheets

FIRST RUN INSTALLER

FIELD OF THE INVENTION

The present invention generally relates to automatically installing files required by other application programs. More particularly, the present invention relates to determining which files are required to execute a program module and installing any missing or newer versions of required files without invoking a separate manual installation procedure.

BACKGROUND OF THE INVENTION

Before an application program is used, it must typically be installed onto a computer system. The installation procedure generally involves copying executable and data files, including files such as shared library files that are necessary during the application's execution, from a source location to an installed location on the computer system. Typically, the source location is an installation disk or a location on a network drive accessible by the computer system. Often the data files are stored in a compressed format to conserve storage space.

This installation procedure is costly for the user and the software developer/manufacturer who supports the application being installed. It is costly to users to perform in that it takes time and, in many cases, more understanding of the product and installation process than the user initially possesses. It is costly to the software developer/manufacturer because the installation procedure has historically caused confusion for users, resulting in a tremendous volume of calls to the software developer/manufacturer's product support center. Installation is typically the single highest call generator in the first months after a product is released to the general public.

Another problem regarding the installation procedure is that it may have to be performed several times for one individual application. Often, the over-zealous user, in an attempt to minimize disk space usage on the computer system, may delete a data file with which the user is unfamiliar. Likewise, the over-zealous user may attempt to rearrange the file structure of the computer system by moving the data files after installation. When this occurs, the application's data files need to be reinstalled forcing the user to go through another installation procedure.

Similarly, data files required by an application may get deleted not by the over-zealous user, but inadvertently by another application or computer process. In addition, the computer's file structure may get inadvertently degraded by a faulty application or faulty hardware. When these situations occur as well, the user is required to reinstall the application's data files in order to execute the application.

Today, application programs use a variety of installation technologies to copy the necessary files from the source location to the computer system. Most often, an application program will include an installation application program for administering and performing the installation procedure. This installation is necessary because many applications required data files to be in known and unchanging locations, paths to which are stored in a registration database and preference files. Getting the files to these locations is a functions of an installation application program, and therefore require a user to utilize the installation application program every time one of the data files is deleted or lost in order to enable a fully working application.

Thus, existing installation technologies fail to support the ability to install required application data files without the user executing an installation application program. Furthermore, existing installation technologies fail to support the user by requiring the user to have some knowledge about the installation of the application in order to properly install the application's data files. Accordingly, there is a need in the art for a method to determine when an application's data files need to be installed and to install these data files automatically and without the requiring user to invoke a separate installation application program.

SUMMARY OF THE INVENTION

The present invention meets the above-described need by providing the ability to detect when a file required by the application is missing and to install the missing file in the proper location without requiring the user to invoke any installation procedure. The present invention achieves this result by, after the launch of the application, checking the computer system for the required files that are necessary for the application's execution. In the event that any of the required files are missing from the computer system, the present invention then automatically installs the application's required files and executes the application all without requiring the user to proceed with an installation or prompting them for installation parameter values.

In one embodiment of the present invention, the missing required files are installed by first storing the location of the application being launched at a temporary location in the computer system. An installer module is then launched and the application program is terminated. This action is performed without prompting the user to initiate any installation. A prompt may be given to the user indicating that the installation process is occurring, but no information is required from the user. After terminating the application, and where a second required file is in use, the computer system is checked to determine whether it has sufficient resources in order to execute the application and to accept a copy of the missing required file.

If there are sufficient system resources, the installer program installs the missing required file to the location expected by the application. After the missing required file is installed, then the computer system must be restarted, particularly in those instances where the second required file is a shared file used by multiple applications.

In the event that the second required file is not in use, then again, the present invention checks whether there are sufficient system resources. If sufficient computer resources exist, then the missing file is installed, by the installer, to the location in the computer system where it is accessible by a shared library Dynamic Link Library (DLL). The location of the application that launched the installer is then retrieved from the file where it was stored prior to its termination. Using the application's address information, the installer module then launches the application.

In one embodiment of the present invention, the file required by the application is stored in a compressed format in the installer module. In another embodiment of the present invention, not only is the missing required file replaced by the installer module, but the installer program checks required files that are still located on the computer system and replaces those required files that are an older version than the required files contained in the installer module.

The advantage of the present invention is that data files required by the application are installed, where they are accessible to the application (through the shared library DLL), but without requiring the user to perform any installation procedure. This allows the user to: (1) launch an uninstalled application that is contained in the shipping medium, such as a compact disc ("CD"), without the user providing any installation parameters to the system, and end up with an application that is fully enabled; and (2) launch a previously installed application, where one of the required files have become missing or deleted, again without requiring the user to provide any information, and end up with a application that is fully enabled.

DETAILED DESCRIPTION

The present invention is directed to a method for providing the ability to install required files that are necessary for an application's execution without prompting a user to perform a separate installation procedure. Briefly described, the present invention allows a user to launch an application execution process, without the user first ensuring that files required by the application exist. The present invention then verifies the existence of any required files. In the event that any required files are missing, the present invention installs those required files.

In the process of installing the required files, system resources are verified to confirm that the computer system has sufficient resources to run the application and, in addition to installing the required missing file, the installer module will also install other required files to the computer system when a newer version of the required file exist in the installer module than where accessed by the shared library DLL in the computer system. If any of the required files necessary for the application's execution are currently in use by another process in the computer system, the installation procedure will also force a restart of the computer system after installing the required files. In the event that there are no required files currently in use by another process in the computer system, then the application execution process is completed.

Exemplary Operating Environment

Figure 1:
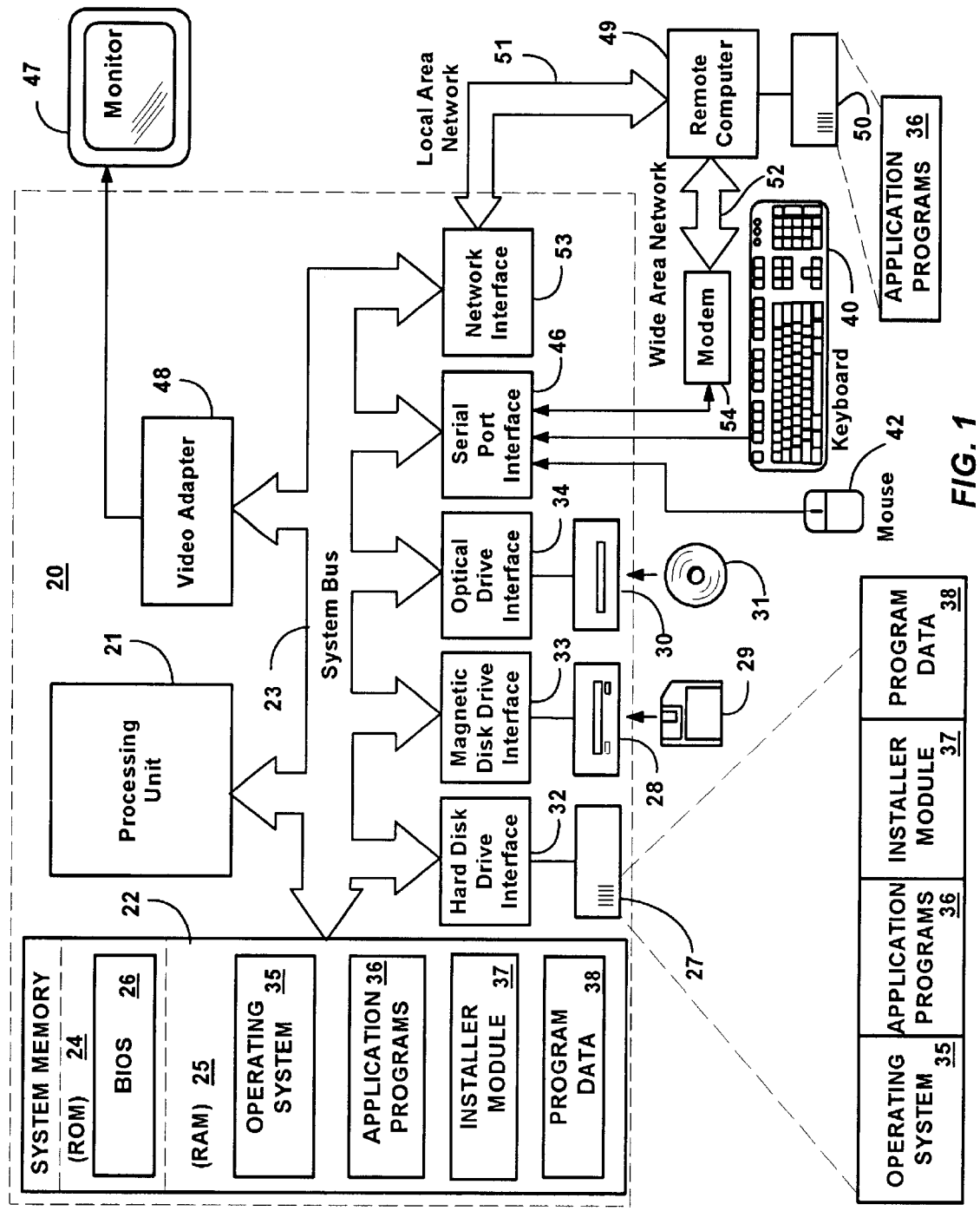
FIG. 1 is a block diagram of a conventional personal computer that provides a portion of the operating environment for an exemplary embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, installer module 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
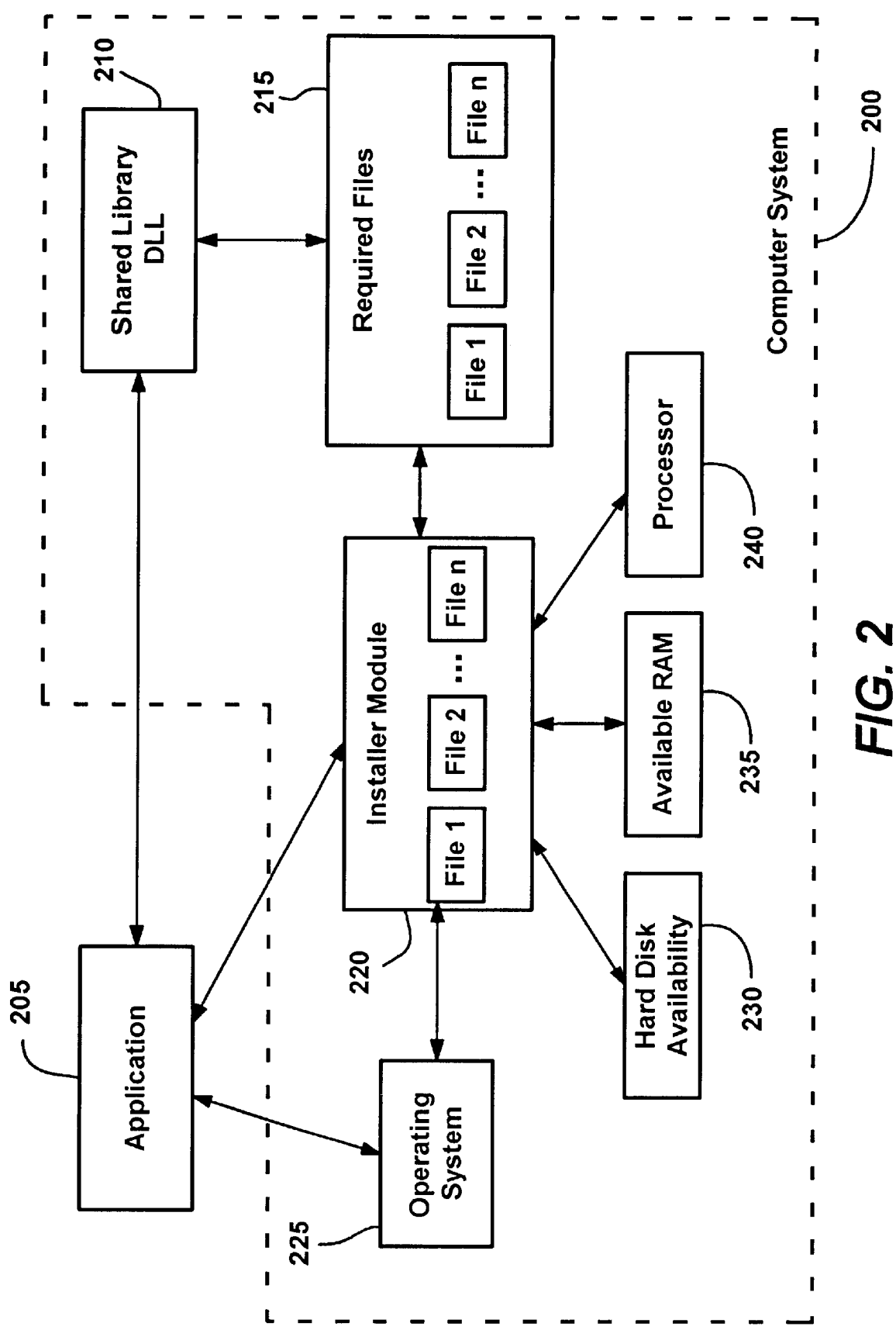
FIG. 2 is a block diagram depicting components and functions used in an exemplary embodiment of the present invention.

FIG. 2 is a block diagram depicting components and functions used in an exemplary embodiment of the present invention. One embodiment of the present invention utilizes three main components. These components include the application 205, the shared library dynamic link library (DLL) 210 and the installer module 220. An example of a shared library DLL 210 is MICROSOFT OFFICE 98 shared library developed by Microsoft Corporation, Redmond, Wash. An example of an installer module 220 is the MICROSOFT OFFICE FIRST RUN also developed by Microsoft Corporation, Redmond, Wash. The application 205 requires specific files in the computer system 200 in order for it to execute properly. In one embodiment of the present invention, the required files necessary for the application are object linking and embedding (OLE) libraries that utilize shared functions and global parameters that can be shared amongst a suite of applications of which the application 205 would be a member. For example, in the case where the application is an application contained in the suite of applications that make up MICROSOFT OFFICE 98 MACINTOSH EDITION, developed by Microsoft Corporation, Redmond, Wash., the required files for that application include Microsoft OLE automation, Microsoft OLE library, Microsoft structured storage, and Microsoft component library.

The location of these required files 215 will be predetermined and known by the application 205, the shared library DLL 210 and the installer module 220. As an example using the Macintosh operating system developed by Apple Corporation, Cupertino, Calif., the required files are located in the extensions folder contained in the SYSTEMS FOLDER. While this example is used to describe required files for the application 205 in terms of a Microsoft application using the Macintosh operating system and accessing shared libraries, it will be recognized by those skilled in the art that this invention also applies to any set of required files that are required by an application and other operating systems.

Upon start-up or "launching" the application 205, the application calls the shared library DLL 210 in order to determine whether the required files for the application exist. The shared library DLL 210 checks for the required files on the computer system 200. The location of the required file is predetermined and known to the shared library DLL and the installer module. As stated, in the Macintosh environment, these required files 215 will be located in the extensions folder. The shared library DLL 210 determines whether the application 205 can launch successfully by checking whether all the files required by the application 205 are accessible to the application. It will be recognized by one skilled in the art that the application may take any steps desired by the application's software developer to inform the user in the event required files are missing as well as perform tasks the developer feels is necessary when a required file is missing.

If a required file is missing, the application then invokes an installer module 220 in order to replace any required files. The installer module 220 may be located on the computer system 200 or may be located on the shipping media (not shown). The installer module 220 interfaces with the required files 215 in order that it may replace any required files that are missing and that the application 205 needs. The application and the installer module interface with the operating system to determine whether the operating system has the appropriate version necessary to run the application.

It should be noted that FIG. 2 depicts functional interactions as well as distinct components. For example, the shared library DLL 210 may interface with the operating system 225. However, only the application 205 and the installer module 220 are shown to interface with an operating system. The application and installer module's interface with the operating system is to retrieve information more directly related to the present invention than the shared library DLL's interface with the operating system, even though one may exist. Therefore, for clarity and with no intent to imply that interfaces do not exist, particularly with the other functional depictions, namely hard disk availability 230, available RAM 235 and processor 240, only those interfaces are shown that are more directly related to the operation of the present invention.

The installer module 220 also performs other system checks to determine whether there is enough disk space, RAM, etc. necessary for the application's execution. Specifically, the installer module will check hard disk availability 230 to determine whether there is enough space to install the required files necessary for the application. The installer module 220 will also check the available RAM in the computer system 200 to determine if there is enough space to execute the application 205 using the missing required file. The installer module 220 will also check the processor 240 of the computer system to determine if the computer system contains the correct processor in order to run the application 205.

It should also be noted that FIG. 2 depicts the application 205 as not being contained in the computer system 200. One advantage of the present invention is that the application 205 may be contained in the storage medium on which it was shipped. In this capacity, the application 205 may be launched directly off the shipping medium, such as a compact disk (CD). In this embodiment, the application is not located on the computer system, however, the installer module does all the checking to ensure that the required files for the application are in existence and proceeds to launch the application while still having the application on the shipping medium, not installed on the hard drive of the computer system.

Figure 3:
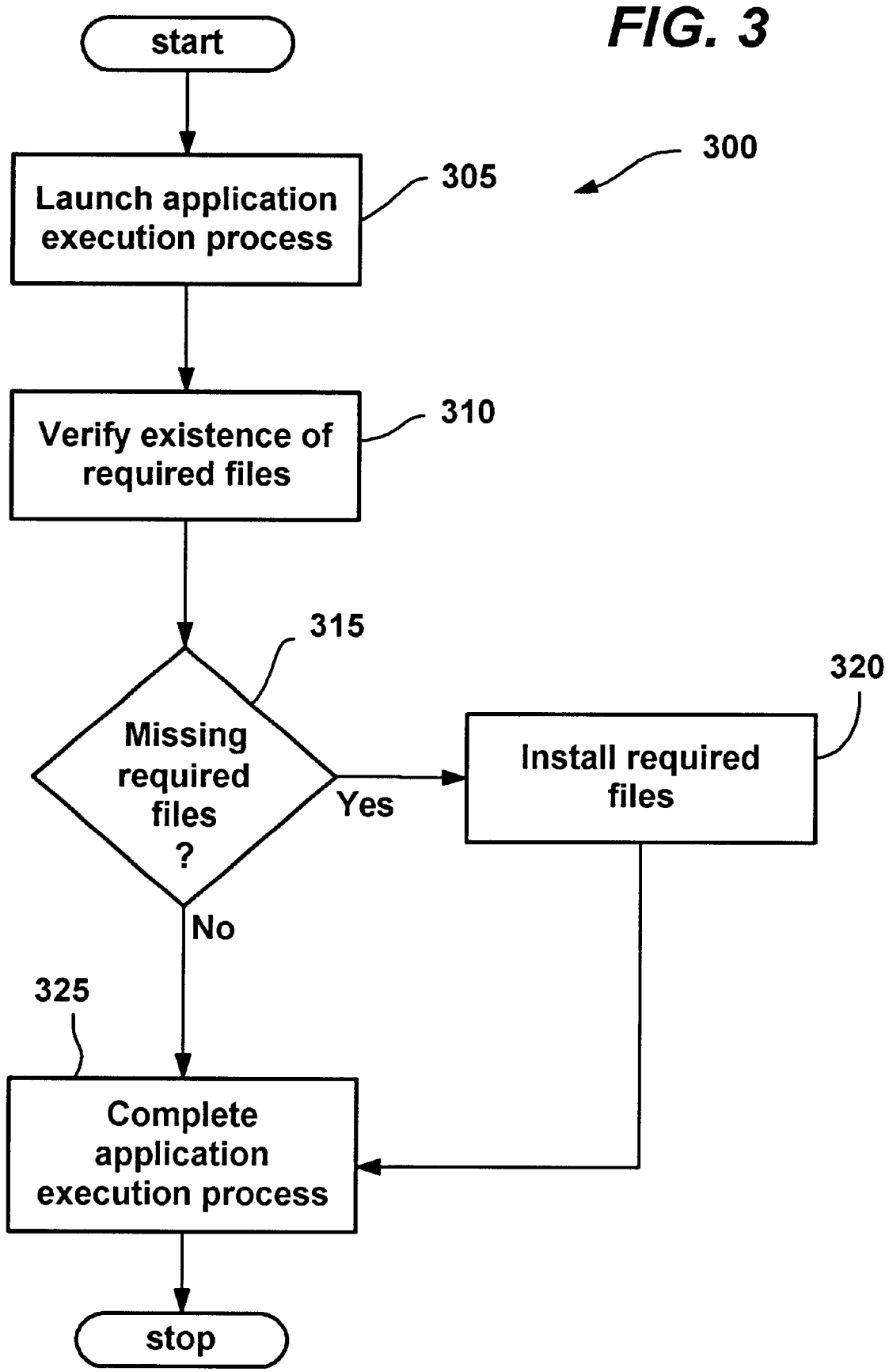
FIG. 3 is a flowchart depicting a process to execute an application and automatically install any required files in an exemplary embodiment of the present invention.

FIG. 3 is a flowchart depicting a process to execute an application and automatically install any required files in an exemplary embodiment of the present invention. The method 300 begins at step 305 where the execution process for the application is launched. As stated above, the application need not necessarily reside on the computer system in order to be launched. The application may reside on the shipping medium of which it was shipped to the user. Launching the application execution process may be performed by either double-clicking on the application itself or it may be performed by merely copying the application from the shipping medium to the hard disk of the computer system.

After the application execution process is launched, method 300 then proceeds to step 310 to verify the existence of required files. This verification is done without prompting the user or requiring the user to make any selections involving what the user would like to install onto the hard drive of the computer system. In the case where the MACINTOSH operating system is used and the required files are shared libraries that are required by applications belonging to a suite of applications utilizing the shared libraries, the present invention searches the extension folder to determine if the required shared libraries exist.

To verify the existence of required files in step 310, one embodiment of the present invention initiates a link with the shared library DLL and calls the shared library DLL to check for the required files in the computer system. The shared library will return whether the application can launch successfully thereby giving an indication that at least one required file is missing or unavailable.

After verifying the existence of the required files, the method 300 proceeds to step 315 where it uses the results of the verification to determine whether any of the required files are missing. If, in fact, there are required files missing in step 315, the "Yes" branch is followed to step 320 where the method 300 proceeds to install the required files. In one embodiment of the present invention, the required files are located in the installer module in a compressed format. Naturally, in this embodiment, the installer module is required to decompress the compressed missing required file located in the installer module and place the decompressed required file where the application and the shared library DLL can access it.

If there are no missing required files in step 315, then the method 300 follows the "No" branch to step 325, where the application execution process is completed. This is the case where the application is executed, everything that the application requires is where it is supposed to be on the computer system, and no installation of any type of files is necessary. After step 320, installing the required files, method 300 also proceeds to step 325 where the application execution process is completed. Following the completion of the application execution process, method 300 stops.

In one embodiment of the present invention, it is required to terminate the application process in order to install the required files in step 320 and to reinitiate the application execution process prior to step 325 where the application execution process will be completed.

It should be noted that when using the method 300, the application was launched when it had not been previously installed onto the computer system or when it was not necessarily even copied onto the computer system. All that was required by the user was to launch the application and present invention ensured that the files required by the application were installed in the appropriate place in the computer system. The user was not required to make any decision as to what type of install they would desire for the application, nor were they required to request where they would like to put the files. The user is not burdened by these difficult and sometimes technically advanced questions in order to execute the application and perform the desired functions in that application.

Figure 4:
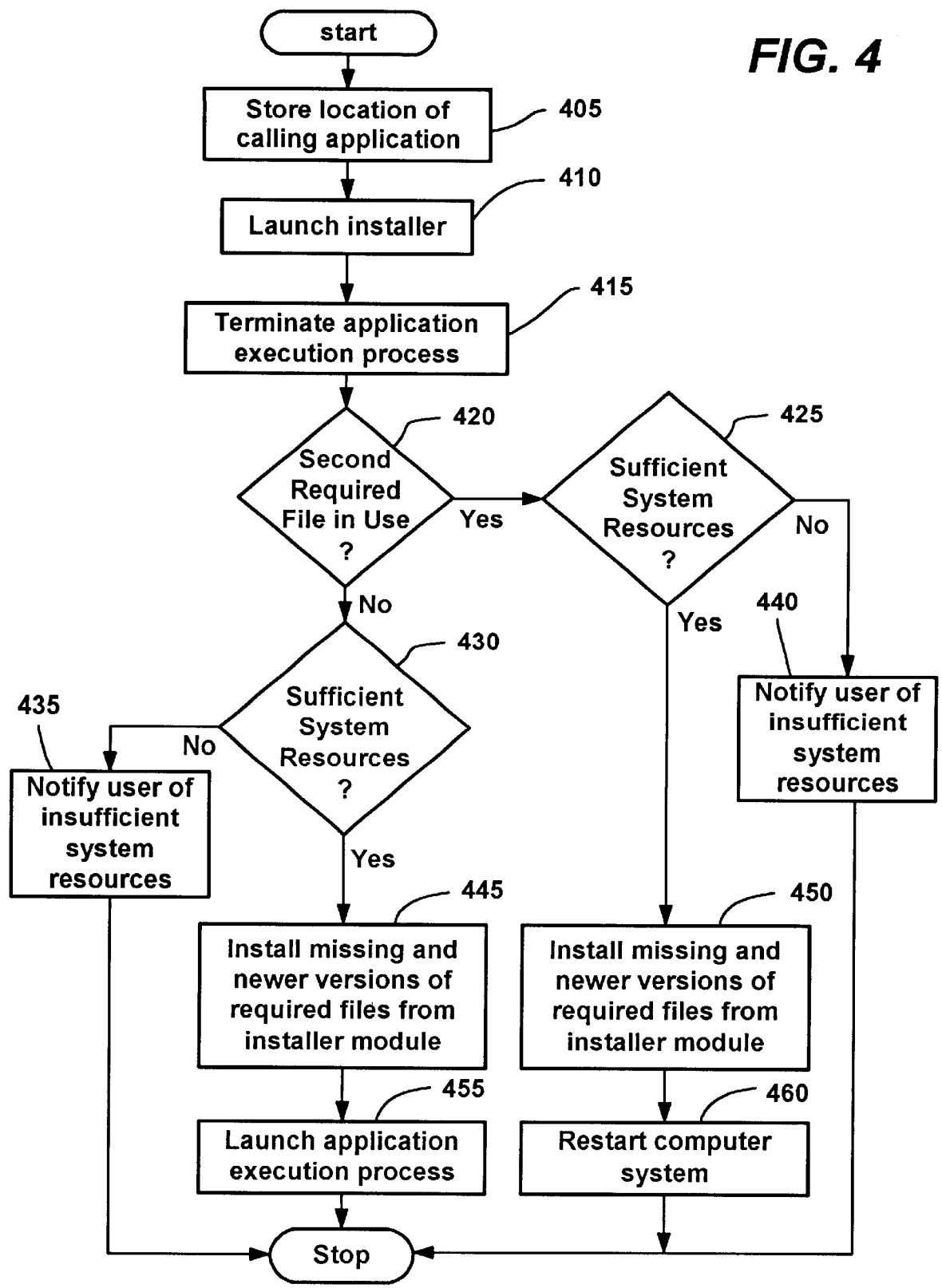
FIG. 4 is a flowchart depicting a process to install a required file needed by an application in an exemplary embodiment of the present invention.

FIG. 4 is a flowchart depicting a process to install a required file needed by an application in an exemplary embodiment of the present invention. The method 400 begins at step 405 where it stores the location of the calling application. This location may be on the computer system or, as described earlier, may be on the shipping medium of the application.

Prior to invoking method 400, the application is aware that required files are missing or are needed through a call to the shared library DLL, and consequently, is aware of the need to install these missing files. Therefore, after storing the location of the calling application in step 405, the installer module is launched at step 410.

The installer module will be responsible for controlling the installation of the missing required files. After launching the installer, method 400 proceeds to step 415 where the application execution process is terminated. The installer module has been invoked because the application could not launch successfully (i.e., the application execution process could not be completed) due to one or more missing files required by the application. The application execution process may be reinitiated after the required files are installed.

After terminating the application process, the method 400 proceeds to step 420 where the installer then checks to determine whether there is a second required file that is in use. This second required file is a different file than the missing required file which prompted the installation.

As shown in FIG. 2, there can be multiple required files that an application needs to execute. (see FIG. 2, Required Files 215). While one of the required files may be missing, one or several of the other files might be in use by other applications or other computer processes that are currently being executed in the computer system. In one embodiment of the present invention, when the installed procedure is initiated, it will attempt to replace not only the required file that is missing, but also replace any of the required files with a newer version that is located in the installer module. Therefore, when a second required file is in use, in this embodiment, the system must be restarted in order that the system is aware that the new version of the second required file has been installed. Returning to method 400, if a second required file is in use in step 420, the "Yes" branch is followed and the system resources are checked in step 425 to determine whether there are sufficient resources to execute the application. The resources checked in step 425 are: whether an adequate version of the operating system is running; whether there is sufficient RAM in the computer system to execute the application; whether the processor used by the computer system is adequate to execute the application; and whether there is sufficient disk space in order to install the required file.

If there are insufficient system resources in step 425, then the "No" branch is followed to step 440 where the user is notified of the insufficient system resources and the method 400 stops. If there are insufficient system resources, the installer module will not attempt to load any of the missing required files, nor will it attempt to update any of the required files that do exist with the newer version.

However, if in step 425 there are sufficient resources, then the method 400 proceeds to step 450 where the newer required files are installed from the installer module to the location expected by the shared library DLL in the computer system.

All of the required files accessed by the shared library and necessary for the application execution process are located in the installer module. For efficiency, it is preferred that these required files located in the installer module are compressed and contained in the data portion of the installer module. It is not necessary that all the required files be replaced or even that the required files that are older versions be replaced by newer versions located in the installer module. However, it is preferred for optimal efficiency, to use in the latest versions of the required files. To achieve this result, one embodiment of the present invention compares the required files located in the installer module against the required files accessed by the shared library DLL on the computer system. If the required file accessible by the shared library DLL is an older version then the one located in the installer module, the installer module installs the newer version. This ensures that the most updated versions of the required files are on the computer system to be used. However, it will be recognized that it is also adequate that only the missing required file needed by the application execution process, be installed by the installer module.

After the missing required file or the newer required files is installed from the installer module into the computer system, the method 400 then proceeds to step 460 where the computer system is restarted. This restart is necessary because a second required file is in use and the computer system needs to be aware that a newer version of the second required file exists.

It is preferable, prior to initiating the installation of the required files in step 450, that the user be informed that a restart will be necessary following the installation of the files and, preferably, given an option to refuse the installation. This user option may be important because processes may be executing on the computer system that the user would prefer to continue versus executing the current application. It is well-known to those skilled in the art to include a prompt to cease an installation from executing and returning the computer system to the state prior to the installation procedure having begun.

Returning back to step 420, in the event that a second required file is not in use, the "No" branch is followed and the method 400 proceeds to step 430 where it checks for sufficient system resources. Similar to in step 425, the computer system is checked to determine: whether the minimum acceptable operating system version is running; whether there is sufficient RAM in the computer system to execute the application; whether the processor contained in the computer system is adequate to run the application, and whether there is sufficient disk space to copy the newer files or the missing required file onto the hard disk of the computer system.

If there are insufficient system resources in step 430, then method 400 proceeds to step 435 where the user is notified of the insufficient system resources, the installation procedure is terminated and the method 400 stops. However, if there are sufficient system resources, then the method proceeds to step 445 where the newer required files are installed from the installer module to the computer system. Again, as described with step 450, it is preferable that a copy of the required files necessary for the application's execution be compressed and located in the installer module. And again, it will be necessary to decompress the required files located in the installer module prior to installing them onto the computer system where the shared library DLL can access them.

Also similar to step 450, in addition to installing the missing required file, it is also preferable to check all the required files that the shared library DLL has access to and update any older versions of the required files with new versions located in the installer module. By doing this, the computer system is assured of having the highest version of the required files that are accessible either by the installer module or the shared library DLL and having these required files available to the application for its execution.

Following step 445, the process of updating all the required files is complete. Because a second required file is not in use, the method 400 proceeds to step 455 to launch the application execution process. To launch the application execution process, the method 400 retrieves the location of the calling application that was stored in step 405. Having retrieved this stored information, the installer module then launches the application execution process and terminates itself. The application execution process can now be completed because all the required files required by the application, and that are accessed by the shared library DLL, are now accessible to the application. Following step 455, the method 400 then stops.

This entire process of installing the required files and updating the versions of the required files has been performed without requiring the user to have any knowledge that an installation has even taken place or, more importantly, to have any knowledge of how to perform any part of the installation. The present invention has freed up this burdensome task from the user, which they may not be well-equipped, technically, to perform.

In summary, the present invention provides a method for installing files required by an application during execution, without requiring the user to invoke an installation procedure if the file is inadvertently deleted or missing. The present invention detects whether a file required by the application is missing. If the file is missing, the application calls an installer module to install the missing file in the location expected by the application. The application then terminates. The installer module then controls the installation of the missing required files. The installer may also update versions of other required files that are accessed by the shared library DLL.

In the event a second required file is in use, the installer will restart the system after having installed the required file. In the event a second required file is not in use, the installer will launch the application so that the execution process can be completed. The entire installation procedure can be performed without the user invoking an installation program or providing any information to the installer module.

From a reading of the above description pertaining to the disclosed embodiments of the present invention, other modifications and variations thereto may become apparent to those skilled in the art. Therefore, the scope of the present invention is to be limited only by the following claims.

What is claimed is:

1. A computer readable medium having computer-executable instructions for installing, in a computer system, a file required by an application during the application's execution, which when executed perform steps comprising:

launching an execution process for the application;

calling a shared process with information corresponding to an identity of the required file;

verifying via the shared process the existence of the required file on the computer system;

in the event the required file is not in existence,
installing the required file onto the computer system; and completing the execution process for the application.

2. The computer readable medium of claim 1, wherein the step of installing the required file comprises the steps of:

terminating the execution process for the application;

automatically installing the required file by an installer program onto the computer system; and automatically re-launching the execution process for the application when the required file is installed.

3. The computer readable medium of claim 2, wherein the required file is compressed, and having instructions which, when executed, perform further, prior to the step of installing the required file, the step of decompressing the compressed required file.

4. The computer readable medium of claim 1, wherein the step of verifying the existence of the required file comprises searching a system folder in the computer system to determine if the required file is located in the system folder.

5. The computer readable medium of claim 1, wherein the step of completing the execution process for the application comprises the step of:

in the event a second file version required by the application has another version thereof currently being used by another application, installing the second file version and restarting the computer system.

6. The computer readable medium of claim 1, wherein the step of verifying the existence of the required file is performed by a procedure called by the execution process for the application.

7. A computer readable medium having computer-executable instructions for installing, in a computer system, a file required by an application during the application's execution, which when executed perform steps comprising;

launching an execution process of the application;

verifying the existence of a required file;

in the event a required file is not in existence,
terminating the execution process for the application,
automatically installing the required file onto the computer system, wherein the required file is located via an installer program, and
automatically re-launching the execution process for the application; and completing the execution process for the application.

8. The computer readable medium of claim 7, wherein prior to the step of completing the execution process for the application, having instructions which, when executed, further perform the step of, verifying the version of the required file.

9. The computer readable medium of claim 7, wherein the required file located in the installer program is a compressed file, the step of installing the required file has instructions which, when executed, further perform the steps of:

decompressing the compressed required file located in the installer program; and installing the decompressed required file onto the computer system.

10. The computer readable medium of claim 7, wherein the step of verifying the existence of the required file comprises searching a system folder in the computer system to determine if the required file is located in the system folder.

11. The computer readable medium of claim 7, wherein the step of completing the execution process for the application comprises the step of:

in the event a second file version required by the application has another version thereof currently being used by another application, installing the second file version and restarting the computer system.

12. The computer readable medium of claim 7, wherein the step of verifying the existence of the required file is performed by a procedure called by the execution process for the application.

13. A computer readable medium having computer-executable instructions for installing, in a computer system, a file required by an application during the application's execution, which when executed perform steps comprising:

launching an execution process for the application;

searching a system folder in the computer system of verify the existence of a file required by the application;

in the event the required file is not in existence,
storing the location of the application associated with the execution process for the application,
automatically initiating an installer program having access to the required file in a compressed format,
terminating the execution process for the application,
decompressing the compressed required file,
installing the decompressed required file in the system folder of the computer system,
retrieving the location of the application, and
automatically re-launching the execution process for the application; and completing the execution process for the application.

14. The computer readable medium of claim 13, wherein in the event a second file required by the application is currently being used by another application, restarting the computer system.

15. A method of communicating between an installer application, a procedure in a shared library and an application program in a computer system, comprising:

receiving from the application program, a call to the procedure in the shared library to search for a file required by the application in the computer system;

in response to receiving the call, determining, by the procedure, that the required file does not exist in the computer system;

receiving from the procedure, a call to initiate an installer program, receiving at the application program, from the installer program, a request to terminate the application program;

in response to receiving the request to terminate, terminating the application program;

after the application program is terminated, automatically installing the required file on the computer system by the installer program;

initiating a call to execute the application program from the installer program; and in response to receiving the call to execute, automatically executing the application program on the computer system.

16. The method of claim 15, further comprising:

searching the computer system for an older version of the required file; and in response to finding an older version of the required file, replacing the older version of the required file, by the installer program, with the required file located in a medium accessible to the installer program.

17. The method of claim 15, wherein installing the required files comprises:

decompressing, by the installer program, a compressed required file located in the installer program; and storing, by the installer program, the decompressed required file in the computer system.

18. A computer-readable medium having computer-executable instructions for performing the method of claim 15.

19. In a computing environment, a system comprising:

an executable application program configured to be executed in the computing environment;

an installer mechanism; and a process shared by a plurality of application programs and configured to receive a call related to executing the executable application program, and in response to determine whether a required component of the application program is installed in the computing environment, and if not installed, to automatically invoke the installer mechanism to install the required component.

20. The system of claim 19 wherein the executable application program is executing, is terminated when the required component is determined by the process to not be installed on the system, and is automatically re-executed following installation of the required component.

21. The system of claim 19 wherein when invoked, the installer mechanism replaces at least one other file that was previously installed on the system by installing an updated version thereof.

\* \* \* \* \*

UNITED STATES PATENT AND TRADEMARK OFFICE
CERTIFICATE OF CORRECTION

PATENT NO. : 6,353,928 B1
DATED : March 5, 2002
INVENTOR(S) : Altberg et al.

It is certified that error appears in the above-identified patent and that said Letters Patent is hereby corrected as shown below:

Column 1,
Line 62, "a functions" should read -- a function --.
Line 63, "require" should read -- requires --.

Column 2,
Line 8, "without the requiring user" should read -- without requiring the user --.
Line 65, "installed, where" should read -- installed where --.

Column 3,
Line 42, "file exist" should read -- file exists --.
Line 43, "than where accessed" should read -- than were accessed --.

Column 7,
Lines 45-46, "and present invention" should read -- and the present invention --.

Column 8,
Line 65, "then" should read -- than --.

Column 9,
Line 4, "process, be installed" should read -- process be installed --.
Lines 5-6, "files is" should read -- file is --.
Line 31, "application, and" should read -- application; and --.

Column 11,
Line 27, "the step of, verifying" should read -- the step of verifying --.
Lines 59-60, "of verify" should read -- to verify --.

Column 12,
Line 14, "program, a call" should read -- program a call --.
Line 21, "procedure, a call" should read -- procedure a call --.

UNITED STATES PATENT AND TRADEMARK OFFICE
CERTIFICATE OF CORRECTION

PATENT NO.    : 6,353,928 B1
DATED         : March 5, 2002
INVENTOR(S)   : Altberg et al.

It is certified that error appears in the above-identified patent and that said Letters Patent is hereby corrected as shown below:

<u>Column 12 (cont'd),</u>
Line 22, "prgram," should read -- program; --.

Signed and Sealed this

Twenty-sixth Day of October, 2004

JON W. DUDAS
*Director of the United States Patent and Trademark Office*